Figure 1:
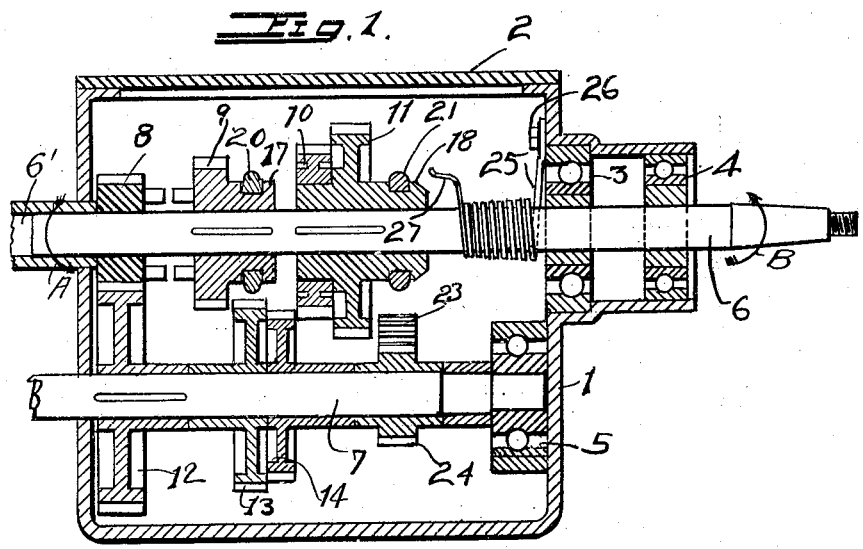

Sept. 13, 1932.  J. H. MORGAN  1,877,014
AUTOMOBILE NO-BACK SAFETY STOP
Filed March 5, 1929  2 Sheets-Sheet 2
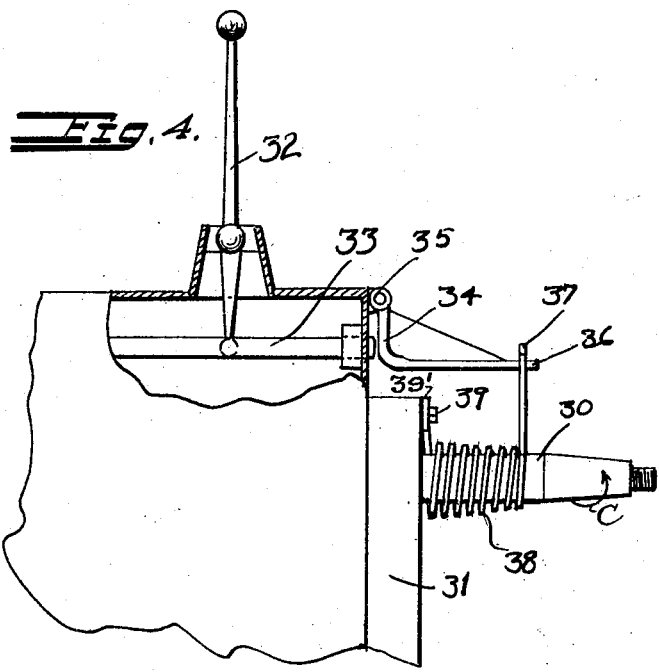
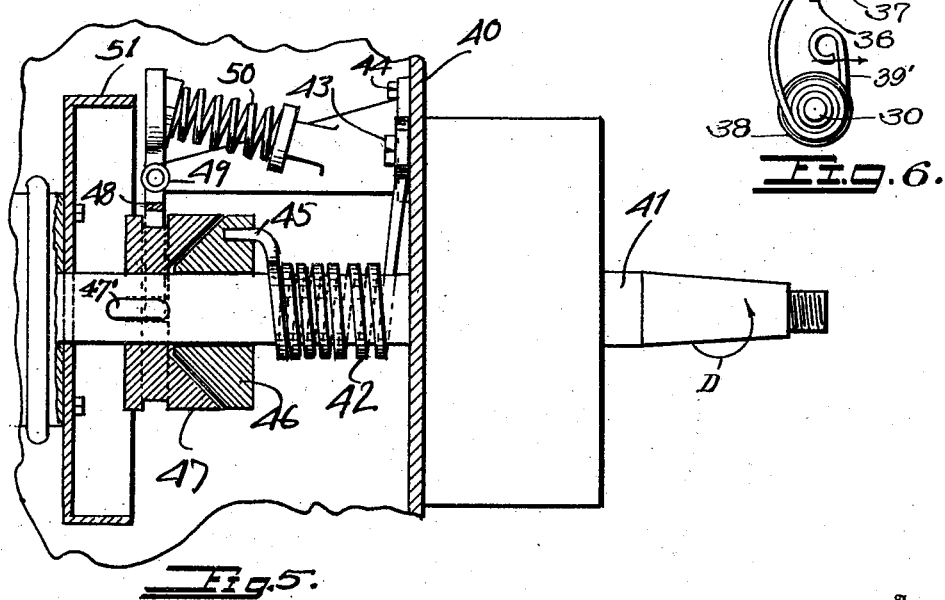
Inventor
John H. Morgan
By Carlos P. Griffin
Attorney Patented Sept. 13, 1932

1,877,014

UNITED STATES PATENT OFFICE

JOHN H. MORGAN, OF PIEDMONT, CALIFORNIA, ASSIGNOR TO MAX L. ROSENFELD, OF SAN FRANCISCO, CALIFORNIA

AUTOMOBILE NO BACK SAFETY STOP

Application filed March 5, 1929. Serial No. 344,343.

This invention relates to a safety device for automobiles intended to prevent the machine from backing up when left upon a steep grade in the event that the brakes are not set, or happen to be accidentally released.

Another object of the invention is to provide means whereby the car can be more easily started upon a grade because this apparatus will prevent it from backing, and the brake can be released to aid the driver in starting and steering the car, as it leaves the hands and foot free.

It will be understood by those skilled in the art that for starting a car upon a grade it will be normally necessary to have the brakes fully set and the driver must be skillful enough to speed the engine with sufficient power for it to take hold in the low speed, while at the same time he is releasing the brakes as rapidly as is needed to permit the engine to drive the car up the hill, but at the same time he must not release the brakes too rapidly, or the car will start backing down the hill.

With this invention the car without the brakes being applied is prevented from backing so long as any possibility of traveling forward or standing still is concerned, but if it is desired to back up the car with the aid of the reverse mechanism, this mechanism will be released and the car will be backed up as usual.

Other objects of the invention will be apparent as the description proceeds.

An embodiment of the invention is shown in the accompanying drawings in which the same reference numeral is applied to the same portion throughout the several figures of the drawings, and of which there may be modifications.

Figure 2:
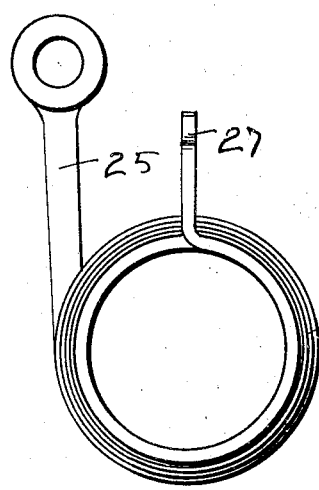
Figure 3:
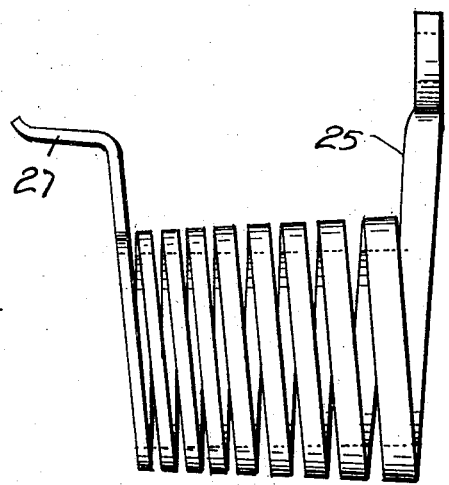

Figure 1 is a vertical sectional view through an automobile transmission mechanism showing this device applied thereto, Figure 2 is an end view, and Figure 3 is a side elevation upon a slightly larger scale of the spring for holding the car, Figure 4 is a side elevation of a portion of an automobile transmission in which this spring has been applied to the main driving shaft outside of the transmission, Figure 5 is a view of the transmission mechanism in which the holding spring is applied to the drive shaft inside the transmission mechanism, but a friction clutch is used to cause the braking spring to prevent the car from running backward, Figure 6 is a detail end view of the shaft looking from the right of Figure 4 and showing the coil spring.

The numeral 1 represents the gear box; 2 the cover therefor; 3, 4 and 5 suitable bearings for the main shaft 6, and intermediate shaft 7.

The main shaft is driven from the engine at the left hand end of Figure 1, by the shaft 6', and it carries the gears 8, 9 which can be inter-meshed side by side for one to drive the other at the engine speed, and the gears 10, 11 which are used for the low speed and the reverse.

The arrow A indicates the forward motion, and the arrow B the reverse or backing motion of the car.

The intermediate shaft 7 carries a gear 12 in mesh with the gear 8, and rigid on the shaft 7.

Near the center are two gears 13 and 14, these gears can mesh with the gear 9, or the gear 14 may mesh with the gear 10. The gear 9 and the gear 11 each have slidable elongated hubs 17 and 18, which hubs are grooved to receive yokes 20, 21, which yokes are for the purpose of engaging the gear 9 with the gear 8, or engaging the gear 9 with the gear 13.

The yoke 21 may engage the gear 10 with the gear 14 to effect the low speed drive, or it may engage the gear 11 with the backing gear 23 driven by the small gear 24 on the shaft 7.

Inside the gear casing there is a heavy spiral spring 25 which is securely bolted to the casing by means of the cap screw 26, and it has a lug 27 which is raised high enough to pass over the ring 21 and be just touched thereby when the gear 11 is moved into contact with the gear 23. The result of the foregoing construction is that whenever one desires to back the car up, and will place the reverse gear in the proper position to do that, that said gear will be moved far enough to permit the yoke 21 to engage the lug 27 and prevent the winding of the spring 25 on the shaft 6.

This action tends to lift up the lug 27 slightly in the direction to unwind the coil, and it also pushes back to bring the coils closer together. The lift of the coil will cause it to bear on the bottom of the shaft 6, but not with pressure enough to cause the coil to wrap around the shaft.

When the shaft turns in the direction of arrow A the tendency of the coil is to unwind, and if it turns in the direction of the arrow B the tendency is to wind up and wrap itself around the shaft to grip it and prevent further motion in that direction.

This spring will not wind on the shaft unless it is free to bear upon its free end, and even at that time it will not stop the shaft from turning in the opposite direction, but will permit the car to be driven forward with a very slight friction on the drive shaft 6.

In the form of the invention shown in Figure 4, the main drive shaft is illustrated at 30, the transmission casing at 31, and the speed lever at 32. The speed lever is suitably mounted to shove the rod 33 back or forward depending upon whether the low speed or the reverse gear is to be operated. If the machine is to be actually operated backwards, the rod 33 will be pushed back at the same time that the reverse gear is operated, and this will raise the bell crank lever 34 slightly, said bell crank lever being pivotally mounted on the casing at 35, and having its point 36 under a projection 37 on the end of the spiral spring 38.

The spiral spring 38 is securely connected to the housing by means of the bolt 39, and it is arranged so that its coils touch the shaft 30 with a slight pressure, this pressure is sufficient to cause the spring 38 to wrap around the shaft 30 when it turns in the direction of the arrow C, which tends to wind up the spring and grip the shaft, when the shaft turns in the opposite direction, the tendency is to unwind the coils and allow them to slip on the shaft. As shown in the drawings of Figure 4, the spring 38 is wound up tight and gripping the shaft 30, to prevent further rotation of the shaft in the direction of the arrow C. All of coils bear on the shaft as the spring is made of tapering wire as shown in Figure 3. When the shaft turns in the opposite direction to that indicated by the arrow the tendency is to unwind the spring, but the movement of the coils is very slight, just enough to allow free rotation of the shaft.

In the form of the invention shown in Figure 5, the gear casing is indicated at 40, the main drive shaft at 41, and the spring holding mechanism at 42. One end of the spring is bolted to the inside of the casing at 43, and it has several turns around the shaft with its other end 45 forced tightly into a hole in the small clutch collar 46. The clutch collar 46 fits the clutch collar 47 which has a yoke 48. This yoke is pivotally mounted at 49, and a light spring 50 holds the two clutch members 46 and 47 in engagement with each other. The arrow D indicates the reverse or backing motion of the car in this instance.

The block 47 is adapted to slide freely longitudinally on the shaft 41, but it is made to rotate therewith by means of the feather key 47'. The spring 50 is so adjusted as to cause the block 47 to bear slightly on the block 46, and thus there is a slight slippage between the two blocks when the car is traveling forward, this slippage however is very slight, as it tends to unwind the spring 42, and thereby shorten the spring which acts to pull the block 46 away from block 47.

At 51 is shown the steel drum carried by the reverse mechanism.

When the gears are placed in reverse, the flange of this drum will bear upon the upper end of the yoke 48 above the pivot 49 compressing the spring 50, thereby pulling the two blocks 47, 46 out of engagement. This will result in the release of the block 46, and there will be no tendency for it to wind the spring 42 in one direction or the other, but if there is a slight pressure upon the block 47, and the block 46 the tendency will be to wind up the spring 42 on the shaft, and stop the shaft 41 whenever a backward motion of the car is attempted, but when the gears are shifted into reverse, and then the drum 51 compresses the spring 50 and pushes the yoke 48 in such a manner as to release the two blocks 46, 47, whereupon the car will be free to operate backwardly.

The spring used in this invention acts like a rope being snubbed several turns around a post. A very slight pressure of the spring at its free end on the shaft, when the latter turns one direction causes it to hold a very heavy load, but if the shaft is oppositely rotated it does not hold at all, the end of the spring simply sliding on the shaft.

Having thus described my invention, what I desire to secure by Letters Patent of the United States is as follows, but modifications may be made in carrying out the invention as shown in the drawings and in the above particularly described form thereof, within the purview of the annexed claims.

1. A mechanism of the class described comprising a gear casing having a main drive shaft extending therethrough, a spiral spring wound upon and bearing on said drive shaft, one end being fixed, and the other end free, whereby said shaft can turn freely in one direction, but the coils of said spring will wrap and tighten on said shaft to prevent its rotation in the other direction, and means operated with the reverse gear to release the pressure of the spring to allow the shaft to revolve.

2. An apparatus of the class described comprising the combination with an automobile transmission casing of a main shaft extending therethrough, a spiral spring having one end fast to said transmission casing, and the other end free, the coils of said spring wrapping around and bearing upon said shaft, a lever pivotally mounted on the gear casing, and extending into proximity to the free end of the spring, and means whereby said lever will engage the spring to release it from the shaft when the transmission mechanism is placed in the reverse condition.

3. A mechanism of the class described, comprising a shaft adapted to revolve in either direction, a spring coiled and wrapped around said shaft, one end of said spring being fixed, and the other free, whereby said shaft can revolve freely in one direction and be held from turning in the other direction by the winding up of said spring on the shaft, and means to prevent said spring from winding up on said shaft at will.

4. A mechanism of the class described comprising the combination with an automobile transmission casing, of a shaft therein, a spiral spring having one end fixed, wound around said shaft and adapted to wrap around the shaft and hold it from turning in one way, and to allow it to turn freely in the other way, a friction clutch member loose on said shaft and fixed to the other end of the spring, a clutch member slidable and fixed to turn with the shaft, and adapted to engage the face of said loose clutch member, spring means to hold said clutch members engaged, whereby the clutch members will tend to wind up said spiral spring tightly on the shaft when turned one way, and tend to unwind and loosen the coils when turned the other way, and means to, separate said clutch members to allow the shaft to turn in either direction.

5. A mechanism of the class described for preventing motor vehicles from inadvertently rolling backwards comprising a spring one end of which is secured to a fixed point, the other end of which is coiled around a shaft of a motor vehicle transmission, and a projection from the spring adapted to contact with the gearing of the transmission when said gearing is placed in the reverse position to release the spring to permit the motor-vehicle to be backed up.

6. A mechanism of the class described comprising the combination with an automobile transmission casing of a plurality of transmission gears therein including a reverse gear, a coil spring having one end fixed to said casing and a free end coiled around and bearing upon the main shaft of the transmission a lug projecting from said spring and adapted to be engaged by the reverse gearing when the said gearing is shifted to a position for reversing the direction of the travel of the automobile.

7. A mechanism of the class described comprising a gear casing, a shaft extending through said casing, a plurality of change speed gears including a reverse gear on said shaft, a spiral spring coiled around the shaft and having one end fixed to said casing, and the other end formed into a lug adapted to be engaged by the hub of the reverse gear when said gear is in the reverse position to release the spring and permit the gears to run in the reverse direction.

8. A mechanism of the class described comprising a gear casing, a drive shaft, and an intermediate shaft in said casing, a plurality of change speed gears on said shafts, a slidable reverse gear on said drive shaft, a spring having one end secured to said casing, and wound spirally around said drive shaft whereby the shaft can run freely in one direction, but be held from turning in the reverse direction by the action of the spring coil winding up tightly, a lug on the free end of said spring adapted to be engaged by the hub of the reverse gear when said gear is in the reverse position to release the spring and prevent it from winding up on the shaft and to permit the shaft to turn in the reverse direction.

In testimony whereof I have hereunto set my hand this 28th day of February, A. D. 1929.

JOHN H. MORGAN.